(No Model.)

N. B. YINGLING.
TIRE FOR TRACTION WHEELS.

No. 264,051. Patented Sept. 5, 1882.

WITNESSES:
John R. Words
J. Ed. Strecker

Noah B. Yingling INVENTOR
by
James W. See
ATTORNEY

N. PETERS, Photo-Lithographer, Washington, D. C.

UNITED STATES PATENT OFFICE.

NOAH B. YINGLING, OF SEVEN MILE, OHIO.

TIRE FOR TRACTION-WHEELS.

SPECIFICATION forming part of Letters Patent No. 264,051, dated September 5, 1882.

Application filed June 2, 1882. (No model.)

*To all whom it may concern:*

Be it known that I, NOAH B. YINGLING, of Seven Mile, Butler county, Ohio, have invented certain new and useful Improvements in Tires for Traction-Wheels, of which the following is a specification, reference being had to the accompanying drawings, in which—

Figure 1:
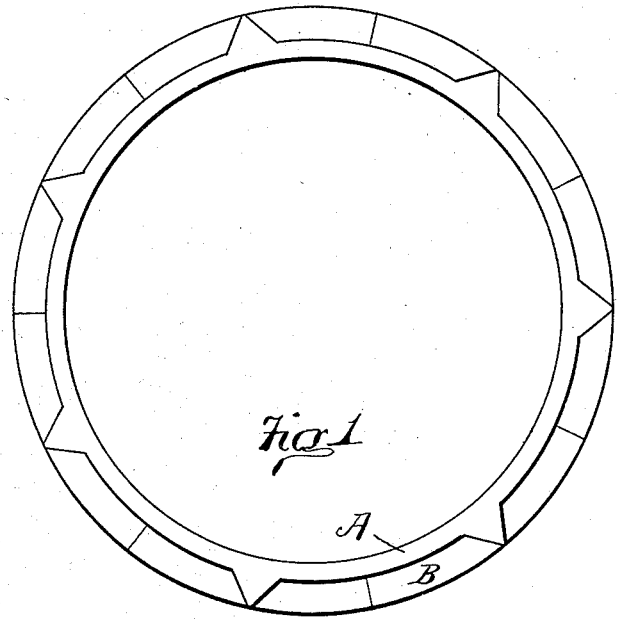
Figure 2:
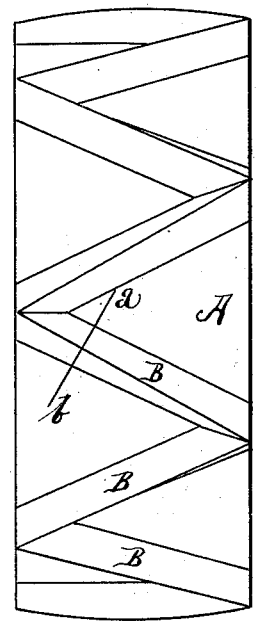

Figure 1 is an end elevation of the tire; Fig. 2, a side elevation of the same, and Fig. 3 a section on the line *a b*.

A is the usual flat tire, intended to form a part of a traction-wheel of a traction-engine, harvester, or any machine operated by a traction-wheel engaging with common soil or a roadway.

Figure 3:
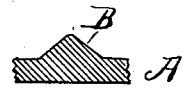

B represents ribs of pyramidal section, as shown in Fig. 3, and arranged around the tire to form a continuous zigzag, as shown in Fig. 2. This results in a continuous bearing of the ribs upon the roadway or soil, and the spaces between the ribs, instead of filling up, as usual, and thus forming the tire really of dirt, clear themselves by reason of their angular slopes in every direction. The continuous rib-bearing does not especially damage a solid roadway when the traction is naturally good, and in softer soil, where a better bite is requisite, the ribs sink deeper.

Traction-tires have been constructed heretofore by others with triangular notches in the sides, so as to form a zigzag tire; but no provision was made against this tire, which bore much resemblance to a double-edged barrel-saw, sinking into the earth an unlimited distance and still continuing its burrowing with the side teeth. There was no common tire to bear the weight in soft soil and prevent the earth from getting inside the wheel as the saw-like tire excavated its way downward. Traction-wheels have also been devised with a tire having a pair of zigzag flanges disposed around it, forming triangular pockets at each edge of the wheel, and a dentated groove between the flanges. By this arrangement the inclines forming the zigzag flanges were very gentle and not well calculated to increase the traction, while the central groove, filled with dirt, more than compensated for what virtue was present in the inclines.

My inclined ribs B reach from edge to edge of the tire A, and are disposed at an angle of about forty-five degrees to the path of wheel-travel. The dirt-catching pockets are all external and self-cleaning, and the tire A prevents improper burrowing and side cutting by the ribs.

I claim as my invention—

In traction-wheels, the combination of tire A and pyramidal ribs B, arranged diagonally across the face of the tire B, and joined at the edges of the tire to form a continuous zigzag, substantially as and for the purpose set forth.

NOAH B. YINGLING.

Witnesses:
  J. W. SEE,
  ALLEN ANDREWS.